April 20, 1954 B. HOLM 2,676,252

WIRELESS RECEIVER CIRCUIT

Filed Oct. 19, 1951

INVENTOR
Bent Holm
By [signature]
Agent

Patented Apr. 20, 1954 2,676,252

UNITED STATES PATENT OFFICE 2,676,252

WIRELESS RECEIVER CIRCUIT

Bent Holm, Copenhagen, Denmark, assignor to Hartford National Bank and Trust Company, Hartford, Conn., as trustee Application October 19, 1951, Serial No. 252,069

Claims priority, application Netherlands November 9, 1950

5 Claims. (Cl. 250—27)

Figure 1:
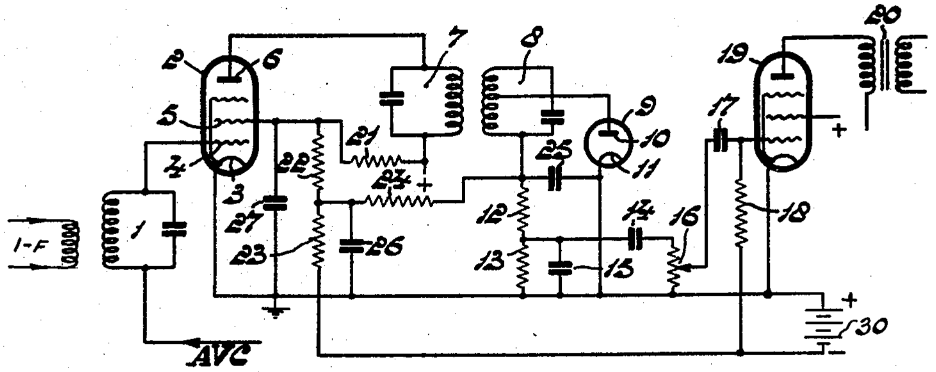

This invention relates to a wireless receiver circuit including a diode detector for detecting the received high-frequency or intermediate frequency signal, its object being to provide a circuit in which the distortion which often occurs is greatly reduced. This distortion occurs with high modulation percentages of the high intermediate frequency signal, if the ratio between the alternating current resistance and the direct current resistance of the diode circuit is less than unity, the alternating current resistance of the diode circuit being understood to mean the resistance of the diode load for the modulation frequency of a detected signal viewed from the diode terminals. The direct current resistance is the corresponding quantity for direct current. The alternating current resistance of the diode will of course depend on its internal reactance with respect to the frequency of the applied signal. The direct-current resistance, on the other hand, will depend on the direct potential applied to the diode electrodes, the direct-current resistance decreasing as the potential on the anode of the diode becomes increasingly positive relative to the cathode thereof, thereby making said diode increasingly conductive.

The distortion brought about by a diode detector in the case of high modulation percentages can be reduced by introduction of a direct current in a positive sense into the diode circuit but it is important that this positively directed current should be very low for small signal amplitudes in order to prevent the damping of the high or intermediate frequency circuit, which is included in the diode circuit, from being increased excessively, said damping being due to the fact that the working point on the characteristic curve of the diode is shifted by the positive bias voltage. Excessive damping is highly detrimental to proper reception of feeble signals. For higher signal amplitudes the increase of the damping is not so important and in this case it is necessary for the current directed in a positive sense to be such that the distortion is a minimum.

Circuits have been suggested in which such a variable current is introduced into the diode circuit but they are very intricate and include, for example, a supplementary rectifier which is coupled with a tuned high or intermediate frequency circuit and which brings about intense damping and a loss of gain. (Electric Engineering, March 1947, pages 94 to 96.)

According to the invention, a current varying in the same sense as the carrier wave amplitude of an incoming signal is derived from the screen grid of an amplifier valve, the amplification factor of which is altered in a manner known per se in accordance with the carrier wave and, via a resistor, is supplied to the diode circuit. In addition, it is also possible to supply to the diode circuit via a resistor a current which is derived from a point whose voltage is negative in relation to the cathode of the diode, the entire circuit being such that the said positive current and the negative current neutralise one another on receipt of feeble signals. It may be remarked here that circuits in which a voltage varying with the signal amplitude is derived from the screen grid of a gain-controlled tube are known but in these known circuits the said voltage serves a different purpose and in view thereof it must have a different form with varying carrier wave of the high-frequency or intermediate-frequency signal.

A fortunate circumstance with the circuit according to the invention is that the optimum relation between the signal strength and the positive bias voltage introduced into the diode circuit can be provided in a very simple manner in most receivers; the positive current is derived from a series combination of two resistors, which are included between the said screen grid and a point of fixed negative potential, this point being constituted by a terminal from which the negative grid bias for an amplifier tube, preferably the end tube of the circuit, is derived.

Figure 2:
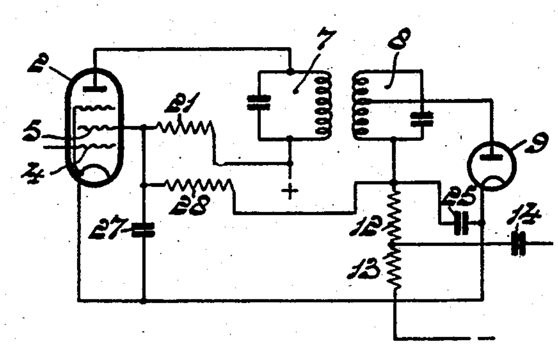

In order that the invention may be more clearly understood and readily carried into effect, it will now be described more fully with reference to the accompanying drawing, in which Fig. 1 shows a first embodiment, and Fig. 2 shows a variation thereof.

Referring to the drawing, 1 designates an intermediate frequency circuit, in which the amplitude-modulated oscillations are operative. The circuit is connected to the input grid 4 of a pentode which comprises in addition a cathode 3, a screen grid 5, a suppressor grid connected to the cathode 3 and an anode 6. The screen grid 5 is connected to the cathode and to the positive terminal of the supply source via a resistor 21 and to the grounded cathode via the by-pass capacitor 27. The lower end of the circuit 1 has supplied to it a voltage for the automatic gain control, which is obtained here in known manner (not shown).

The amplified intermediate frequency signal is derived from the anode 6 which, via a circuit 7 tuned to the intermediate frequency, is connected to the positive terminal of the supply source. A third circuit 8, which is also tuned to the intermediate frequency, is inductively coupled with the circuit 7 and forms therewith a bandpass filter. A tapping of the coil of the circuit 8 is connected to the anode 10 of a diode detector 9, whose cathode 11 is grounded. The lower end of the circuit 8 is also grounded through the series combination of resistors 12 and 13, a capacitor 25 serving to couple the lower end of circuit 8 to cathode 11 with respect to the voltages of intermediate frequency for which has a low impedance. The detected low frequency signal is derived via a capacitor 14 from the resistor 13 and fed to a resistor 16, a slidable tapping point of which is connected via a capacitor 17 to the control grid of a pentode 19. Shifting the tapping point on the resistor 16 enables the amplitude of the input voltage of the tube 19 to be controlled by hand. This tube constitutes the final stage of the receiver circuit, the anode being connected to the primary of an output transformer 20. The resistor 12 and the capacitor 15 constitute together a filter for the intermediate frequency voltages.

According to the invention, the screen grid 5 and the negative terminal of a bias voltage source 30 for the output tube 19 are separated by two serially connected resistors 22 and 23. Bias voltage from source 30 is applied to the grid of output tube 19 via resistor 18.

The elements of the circuit may be such that in the absence of an incoming signal the voltage of the screen grid is, for example, 80 volts, whereas at a maximum incoming signal it may have a value of, say, 200 volts. Assuming further that the negative grid bias voltage of the end tube is about 8 volts, the voltage of the junction point of the resistors 22 and 23 will be about equal zero in the absence of a signal if the ratio of their value is chosen to be equal to $$\frac{80}{8}=10:1$$

so that the voltage of the said common point will increase to about 19 volts if the intermediate frequency signal increases to its maximum value.

Thus, according to the invention, if the junction point of resistors 22 and 23 is connected, via resistor 24 to the junction point of the circuit 8 and the resistor 12, the diode circuit will have supplied to it a positive voltage which varies with the signal amplitude so that the distortion is reduced, while at the same time at a low signal amplitude no appreciable damping is brought about, provided that the value of the resistors 24, 23 and 22 is chosen in an adequate manner with regard to the ratio between the alternating current resistance and the direct current resistance of the diode circuit.

It is essentially possible to omit the resistor 24 but in normal cases this would imply that the resistor 22 must have a value over 10 megohms and such resistors are difficult to find. The capacitor 26 has the function of by-passing any hum voltages that may occur at the screening grid but is generally not essential.

The automatic-volume-control circuit applies a direct voltage bias to the grid of pentode 2 which becomes more negative as the strength of the incoming signals increases. In consequence, the voltage drop across screen grid resistor 21 decreases with an increasing grid bias and increases with a falling grid bias. Hence the positive voltage developed at screen grid 5 becomes higher as the strength of the incoming signal increases, as a result of which the positive voltage applied via resistor 24 to the plate of diode 9 also becomes higher and causes a direct-current flow in diode 9 which increases with increasing signal strength.

The operation of the circuit will be appreciated from the foregoing description; at a low signal amplitude the direct voltage supplied to the diode circuit it about equal to zero so that detection is effected in the usual manner. At high signal amplitudes the positive voltage supplied to the diode circuit has a value such that the distortion which otherwise occurs is greatly reduced. It is easy to make the values of the resistors 22, 23 and 24 such that conditions are optimum. The described solution of the problem is very simple since only three supplementary resistors are required.

Fig. 2 shows a simplification of the circuit of Fig. 1 which consists in that the lower point of the resistor 13 is connected to the source of negative bias and that a single resistor 28 is connected between the screen grid and the lower end of the tuned circuit 8.

What I claim is:

1. In a receiver for incoming amplitude-modulated signals; the combination comprising an amplifier stage responsive to said incoming signals and including an electron discharge tube provided with a cathode, a control electrode, a screen grid and an anode, means to apply an automatic volume control voltage to said control electrode to vary the amplification of said stage as a function of the strength of said incoming signals, a resistance connecting said screen grid to a point of positive potential relative to said cathode, whereby the potential developed at said screen grid varies in accordance with the strength of said incoming signals, a detector stage coupled to the anode of said tube for demodulating the amplified signal and including a diode, means coupled to said screen grid to produce a direct control voltage whose magnitude is substantially zero when said signal strength is at a predeterbined low level and which increases as the signal strength rises above said level, and means to apply said control voltage across said diode in a polarity increasing the conductivity thereof as the signal strength rises above said level.

2. A receiver, as set forth in claim 1, wherein said means to produce a control voltage includes a resistance element connected between said screen grid and a point of fixed negative potential relative to said cathode, and means to derive said control voltage from between a tap in said element and said cathode.

3. In a receiver for incoming amplitude-modulated signals; the combination comprising an amplifier stage including an electron discharge tube provided with a cathode, a control electrode, a screen grid and an anode, means to apply said incoming signal to said control electrode, means to apply an automatic volume control voltage to said control electrode, a first resistance connecting said grid to a point of constant positive potential relative to cathode, a second resistance having a tap and connecting said screen grid to a point of constant negative potential relative to cathode, said positive and negative potentials having relative values at which a control voltage developed between said tap and cathode is substantially zero at a predetermined low strength level of incoming signal, a detector stage coupled to said anode and including a diode having a plate and a cathode, said diode cathode being connected to the cathode of said tube, and means to apply the control voltage from said tap to the plate of said diode.

4. In a receiver, as set forth in claim 3, wherein said means to apply the control voltage to said diode plate includes a third resistance connecting said tap to said plate.

5. In a receiver for incoming amplitude-modulated signals; the combination comprising an amplifier stage including an electron discharge tube provided with a cathode, a control electrode, a screen grid and an anode, means to apply said incoming signal to said control electrode, means to apply an automatic volume control voltage to said control electrode, a first resistance connecting said grid to a point of constant positive potential relative to cathode, a detector stage coupled to said anode and including a diode having a plate and a cathode, a parallel-resonant circuit provided with an inductor having one end thereof capacitively coupled to the cathode of said diode and having a tap thereof connected to said plate, said diode cathode being connected to the cathode of said tube, a second resistance connecting said one end of said inductor to a point of negative potential relative to said interconnected cathodes, and a third resistance connecting said screen grid to said one end of said inductor.

References Cited in the file of this patent

FOREIGN PATENTS

| Number | Country | Date |
|---|---|---|
| 214,305 | Switzerland | July 16, 1941 |